US 6,563,717 B2

(12) United States Patent
Lunding et al.

(10) Patent No.: US 6,563,717 B2
(45) Date of Patent: May 13, 2003

(54) HIGH OUTPUT POWER AND SINGLE POLE VOLTAGE POWER SUPPLY WITH SMALL RIPPLE

(75) Inventors: Arne Lunding, Norderstedt (DE); Heiko Osterholz, Oststeinbek (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/963,328

(22) Filed: Sep. 26, 2001

(65) Prior Publication Data

US 2002/0067631 A1 Jun. 6, 2002

(30) Foreign Application Priority Data

Sep. 28, 2000 (DE) ......................................... 100 48 146

(51) Int. Cl.[7] ............................................. H02M 3/335
(52) U.S. Cl. ............................ 363/15; 363/61; 363/65
(58) Field of Search ............................. 363/15, 59, 60, 363/61, 65

(56) References Cited

U.S. PATENT DOCUMENTS

| 4,816,978 A | * | 3/1989 | Domenget et al. ............. 363/65 |
| 4,994,953 A | * | 2/1991 | Haak ................................ 363/60 |
| 4,995,069 A | | 2/1991 | Tanaka .......................... 378/200 |
| 5,159,544 A | * | 10/1992 | Hughey et al. ................. 363/97 |
| 5,166,965 A | | 11/1992 | Collier ........................... 378/101 |
| 5,424,934 A | * | 6/1995 | Tanuma et al. ................ 363/59 |
| 5,703,770 A | | 12/1997 | Burtin et al. .................. 363/61 |
| 5,818,706 A | * | 10/1998 | Wimmer ........................ 363/61 |
| 5,835,367 A | * | 11/1998 | Pan et al. ...................... 363/61 |
| 6,154,382 A | * | 11/2000 | Kawahara et al. ............ 363/61 |

OTHER PUBLICATIONS

Patent Abstracts of Japan, Honda Kenji, "X–ray High Voltage Device," Publication No. 62061298, Mar. 17, 1987, Application No. 60202104, Sep. 12, 1985.

* cited by examiner

Primary Examiner—Jeffrey Sterrett
(74) Attorney, Agent, or Firm—John Vodopia

(57) ABSTRACT

The invention relates to a power supply for X-ray generators which includes at least one inverter, at least one transformer and at least one voltage cascade for generating a supply voltage for an X-ray tube. In order to increase the output power that can be achieved while ensuring at the same time a comparatively low weight and a small ripple or output capacitance, the voltage cascade is configured in respect of its capacitances and the stray inductance of the transformers in such a manner that it can operate in the resonance mode under appropriate control of the inverter. For said features it is particularly beneficial to use a two-phase or three-phase configuration which can be integrated with an X-ray system so as to form a compact tank generator.

13 Claims, 4 Drawing Sheets

HIGH OUTPUT POWER AND SINGLE POLE VOLTAGE POWER SUPPLY WITH SMALL RIPPLE

The invention relates to a power supply which includes an inverter and a voltage cascade (voltage multiplier) for converting an input voltage applied to the inverter into an output DC voltage (supply voltage), notably a high voltage for X-ray generators or rotating X-ray systems, for example, in computed tomography apparatus, or for single tank generators. The invention also relates to an X-ray system of this kind.

Generally speaking, X-ray systems include an X-ray source with an X-ray tube for generating X-rays, as well as an X-ray generator with a power supply (high-voltage generator) which includes a power supply unit and delivers the high voltage necessary for operation of the X-ray tube. When the X-ray source and the parts generating the high voltage are combined so as to form one structural unit, a so-called single tank generator is obtained.

The operation of X-ray tubes requires anode voltages of up to, for example approximately 150 kV in the case of single-pole power supply or approximately +/−75 kV in the case of double-pole power supply between the anode and the cathode. Numerous requirements are imposed as regards these voltages or the circuit generating these voltages. In order to avoid fluctuations of the X-ray intensity produced, the voltages should be as constant as possible and have a small ripple only. As the output powers become higher, an ever higher output capacitance is then required so as to smooth voltage at a given switching frequency of the inverter.

For fast control of the output voltage and of the output current (for example, in the pulsed mode of operation of the X-ray tube) and notably for fast reduction of the output voltage in the case of small currents, however, an as small as possible output capacitance is to be pursued; this capacitance should also be as small as possible in order to limit the loading of the X-ray tube in the case of a fault.

Furthermore, for application-specific or construction-specific reasons (not described herein) it may also be advantageous to use a single-pole supply voltage. The voltage of, for example 150 kV to be realized in that case imposes special requirements as regards the design of the high-voltage tank.

A low weight and a small volume are especially important in the case of use in single tank generators and in rotating X-ray systems such as, for example, computed tomography apparatus (CT apparatus). These are notably systems that operate with a speed of rotation of several revolutions per second, for example, sub-second scanners in which centrifugal forces of 30 g or more are liable to occur.

U.S. Pat. No. 4,995,069 discloses a power supply for an X-ray tube, in particular for a CT apparatus, in which an AC voltage applied to the input is first rectified by means of a rectifier. In order to generate a double-pole supply voltage for the X-ray tube, for each pole a respective inverter is connected to the rectifier in order to generate an AC voltage and a transformer for stepping up the AC voltage to an intermediate voltage is connected to the output thereof. For each pole the necessary anode voltage or cathode voltage is generated from said intermediate voltages by means of a respective voltage cascade. In order to save weight on the rotating part of the CT apparatus, the input voltage source, the rectifier, the inverters and the transformers are arranged on a stationary part, the secondary terminals of the transformers being connected to the inputs of the voltage cascades via slip rings and slip contacts. This approach, however, is considered to be disadvantageous because the slip rings and slip contacts are subject to comparatively severe wear, notably in the case of high rotary speeds and/or high electric powers, and require frequent maintenance.

Therefore, it is an object of the invention to provide a power supply which is suitable particularly for operation of an X-ray tube in a rotating X-ray system and has a particularly low weight and a small volume in relation to its output power.

Furthermore, it is an object of the invention to provide a power supply of the kind set forth in which the output voltage and the output current can be rapidly controlled also in the case of a high output power and with a small ripple.

Finally, the invention aims to provide a power supply which is also advantageously suitable for generating a single pole supply voltage.

In order to achieve these objects, there is provided a power supply of the kind set forth which is characterized in that it includes a control circuit for generating a switching voltage whereby the inverter can be driven at a switching frequency such that a resonance current is imposed in the voltage cascade.

An advantage of this solution resides in the fact that in the resonant mode a variation of the output power with a very steep characteristic is possible by way of a comparatively small variation of the switching frequency and/or the pulse duty factor with which the inverter is driven.

The saving of weight also enables attractive implementation of mobile X-ray systems.

On the other hand, such a saving of weight can be traded off against proportions enabling a particularly small ripple or a high output power to be obtained.

A further advantage of this solution occurs notably in the case of high output powers, because the inherent loss power is then better distributed among the components so that they are subject to significantly less severe loading.

The present invention offers the advantage that in comparison with known power supplies with voltage multipliers in a cascade configuration (which do not operate in the resonant mode) the transformers can be constructed so as to be significantly smaller and nevertheless have the same output capacitance when a further reduction of the ripple of the output voltage is dispensed with. This offers a significant reduction of the weight of the power supply or a significantly more attractive ratio of the output power of the circuit on the one hand to its weight on the other hand, that is, in comparison with the known voltage cascades. Notably in the case of rotating X-ray systems, for example, computed tomography apparatus, it is thus possible to mount the X-ray source and all components of the power supply advantageously on the rotating part, so that only a comparatively low input voltage must be conducted via the slip rings and slip contacts.

The ratio of the output power to the weight of the circuit can be further improved by other embodiments of the invention. Such improvement is based essentially on the fact that, for example, the transition from one to 3 phases reduces the ripple of the output voltage by a factor of 6 for the same output capacitance of the voltage cascade. Conversely, for the same ripple the output capacitance could be reduced accordingly if (as described above), for example, particularly fast control of the output voltage or the output current for the X-ray tube is important in the pulsed mode of operation.

In another embodiment the invention enables simple control of the resonance current in the cascade, and hence of the output power, by variation of the driving of the inverter. This embodiment is particularly suitable for the pulsed mode operation of an X-ray tube.

Further details, characteristics and advantages of the invention will become apparent from the following description of preferred embodiments which is given with reference to the drawing. Therein;

Figure 1:
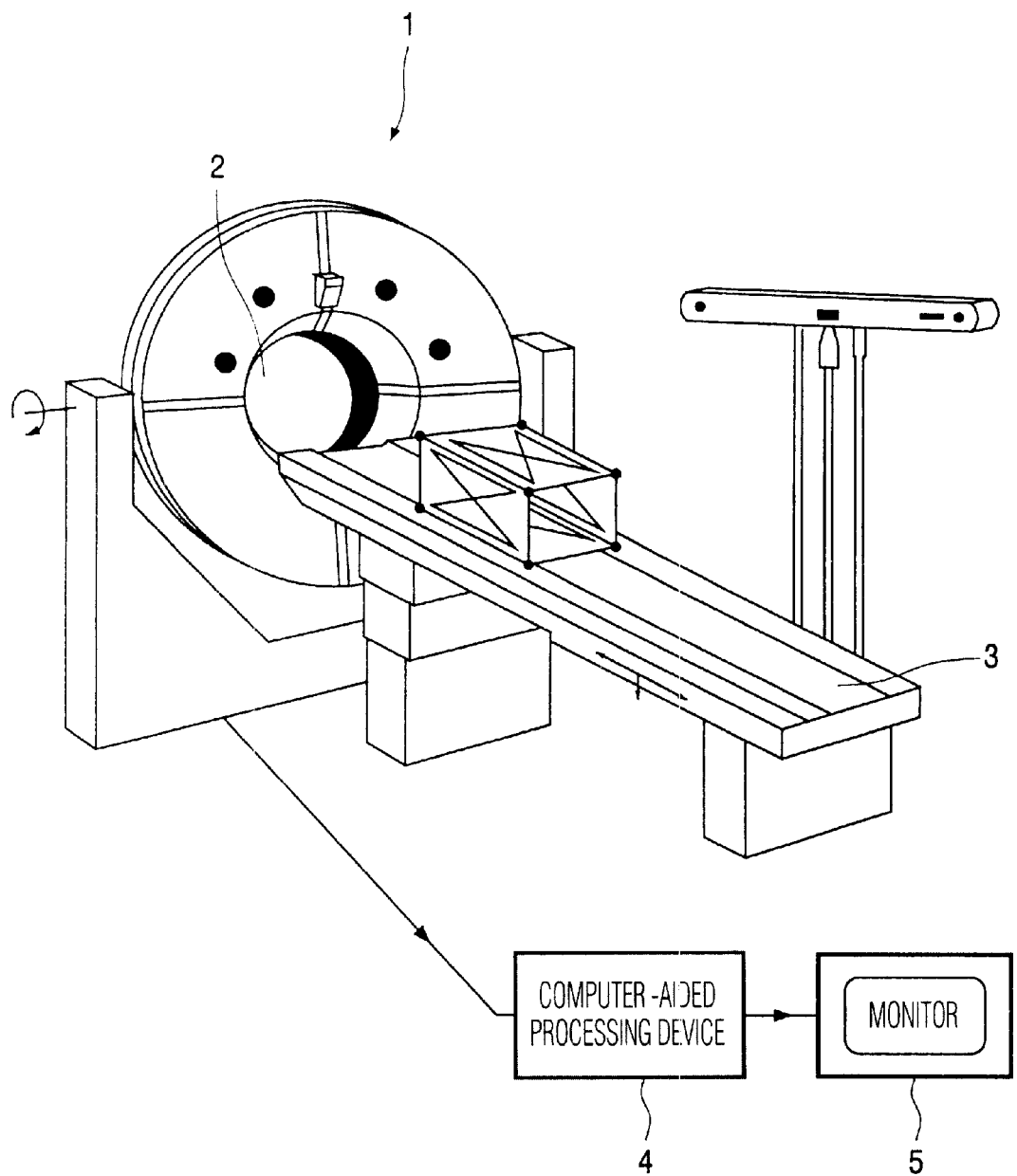
FIG. 1 shows diagrammatically a computed tomography apparatus for examining a patient.

FIG. 1 shows diagrammatically a computed tomography apparatus 1 which includes an opening 2 in which a patient on a table 3 is introduced so as to be examined. An X-ray system and a suitable detector at the same time rotate about the patient within the apparatus 1, that is, essentially along the circumference of the opening 2, so that the patient is scanned in known manner. From the image data thus acquired a tomographic image is formed by means of a computer-aided processing device 4, said tomographic image being displayed on a monitor 5. The operation of such an apparatus is known in principle and hence will not be elucidated herein.

Because the X-ray system rotates around the patient at a speed of up to several revolutions per second, it is particularly important to realize a low weight. A substantial contribution to the overall weight of an X-ray system is made by the power supply, notably by the transformer or transformers thereof; such transformers are necessary so as to generate the high voltage required during operation of the X-ray tube. Inter alia this weight can be significantly reduced by utilizing the power supply in accordance with the invention.

Figure 2:
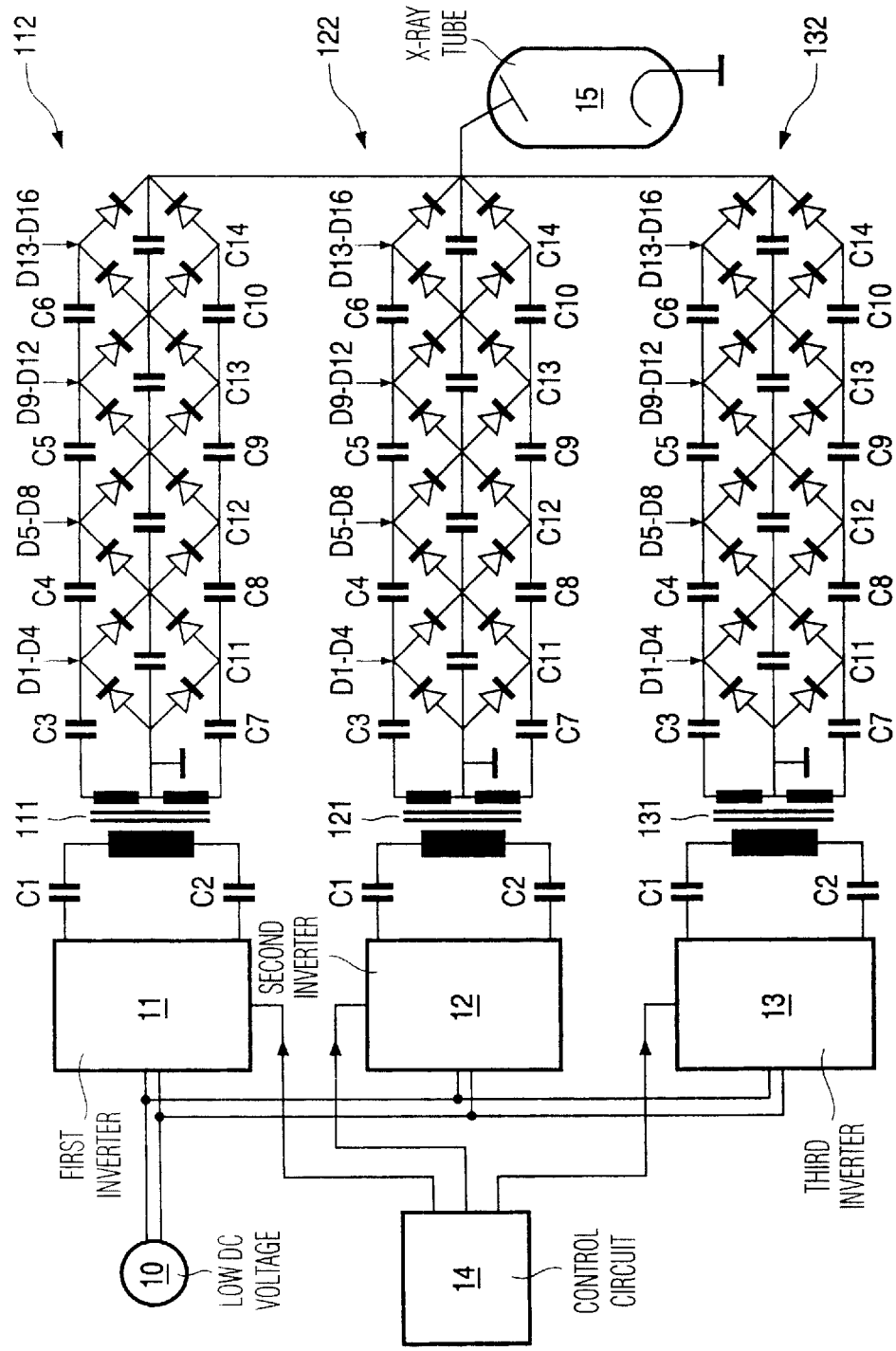
FIG. 2 shows a circuit diagram of a first embodiment in accordance with the invention.

FIG. 2 shows a first embodiment. Like the (second and third) circuits which are shown in the FIGS. 3 and 4, this circuit generates a single-pole high voltage (DC supply voltage) for an X-ray tube, that is, a positive high voltage for the anode by means of the first and the second circuit, the cathode then being connected to ground, whereas a negative high voltage is generated for the cathode by means of the third circuit, the anode then being connected to ground.

Even though exclusively the single pole driving is elucidated herein, the principle of the circuit in accordance with the invention, of course, is also suitable for double-pole power supply of an X-ray tube where the anode and the cathode carry the same voltages of different polarity.

The first circuit in conformity with FIG. 2 is a three-phase circuit which, as has already been explained, offers special advantages in comparison with an embodiment with one or two phases.

More specifically, the first circuit includes a first, a second and a third inverter (11, 12, 13), whose inputs carry a low DC voltage 10 (input voltage or intermediate circuit voltage) and whose outputs are connected, via a first capacitor and a second capacitor (C1 and C2) and via a first, a second and a third transformer (111, 121, 131), respectively, to a first, a second and a third voltage cascade (112, 122, 132), respectively.

Each of the voltage cascades 112, 122, 132 comprises four stages which are composed in known manner of sliding capacitors C3 to C10, smoothing capacitors C11 to C14 and diodes D1 to D16. The outputs of the voltage cascades are connected in parallel and to the anode of an X-ray tube 15 whose cathode is connected to ground.

When an AC voltage is applied as the input voltage, it is first rectified and subsequently applied to the inverters 11, 12, 13.

The inverters 11, 12, 13 may be customary half-bridge inverters or full-bridge inverters whereby the DC voltage 10 is converted into an AC voltage in known manner, for example while utilizing series resonant circuits and semiconductor switches.

The capacitors C1, C2, the stray inductance of the first, the second and the third transformer (111, 121, 131), possibly provided with additional resonance chokes (not shown), as well as the equivalent capacitance of the first, the second and the third cascade (112, 122, 132) connected to the relevant transformer, constitute the essential elements of a respective resonant circuit. In the case of resonance, that is, when the inverters 11, 12, 13 are driven with a respective switching voltage whose frequency is the switching frequency tuned to the resonant frequency of these circuits, each resonant circuit imposes a resonance current in the connected cascade. A central tapping of the secondary winding may then define the reference potential (ground potential).

For the driving of the inverters 11, 12, 13 there is provided a control circuit 14 whereby the semiconductor switches that are present in the inverters and generally are formed by IGBTs, are switched. The three inverters are driven cyclically one after the other, so that the three AC voltages produced exhibit a preferably equal phase shift (120 degrees) relative to one another (3-phase mode of operation).

The above requirement can be satisfied by appropriate configuration of the inverters 11, 12, 13 as well as the control circuit 14 on the one hand and/or appropriate proportioning or adaptation of the stray inductance of the transformers as well as by an appropriate choice of the capacitors on the other hand; the adjustment of these parameters, of course, is also dependent on the number of stages in each voltage cascade 112, 122, 132 and on the desired output power.

In the case of resonance, a respective resonance current flows in the cascades 112, 122, 132, said resonance current giving rise to a particularly high output power. Because this resonance current drops off comparatively steeply in response to a variation of the switching frequency (pulse frequency) of the switching voltage whereby the inverters 11, 12, 13 are driven, that is, in comparison with the case of resonance, such a variation enables simple and very effective control of the output power of the power supply circuit by means of the control circuit 14. Because the output capacitance may be smaller in comparison with a known circuit with the same output power and the same ripple, such control can also be carried out very rapidly.

Furthermore, such control is also possible by way of variation of the pulse duty factor of the switching voltage, that is, a variation of the pulse length at constant pulse frequency, or by way of combination of the two steps (switching frequency and pulse duty factor). To this end, the control circuit 14 is designed so that it can be switched or adjusted accordingly.

Figure 3:
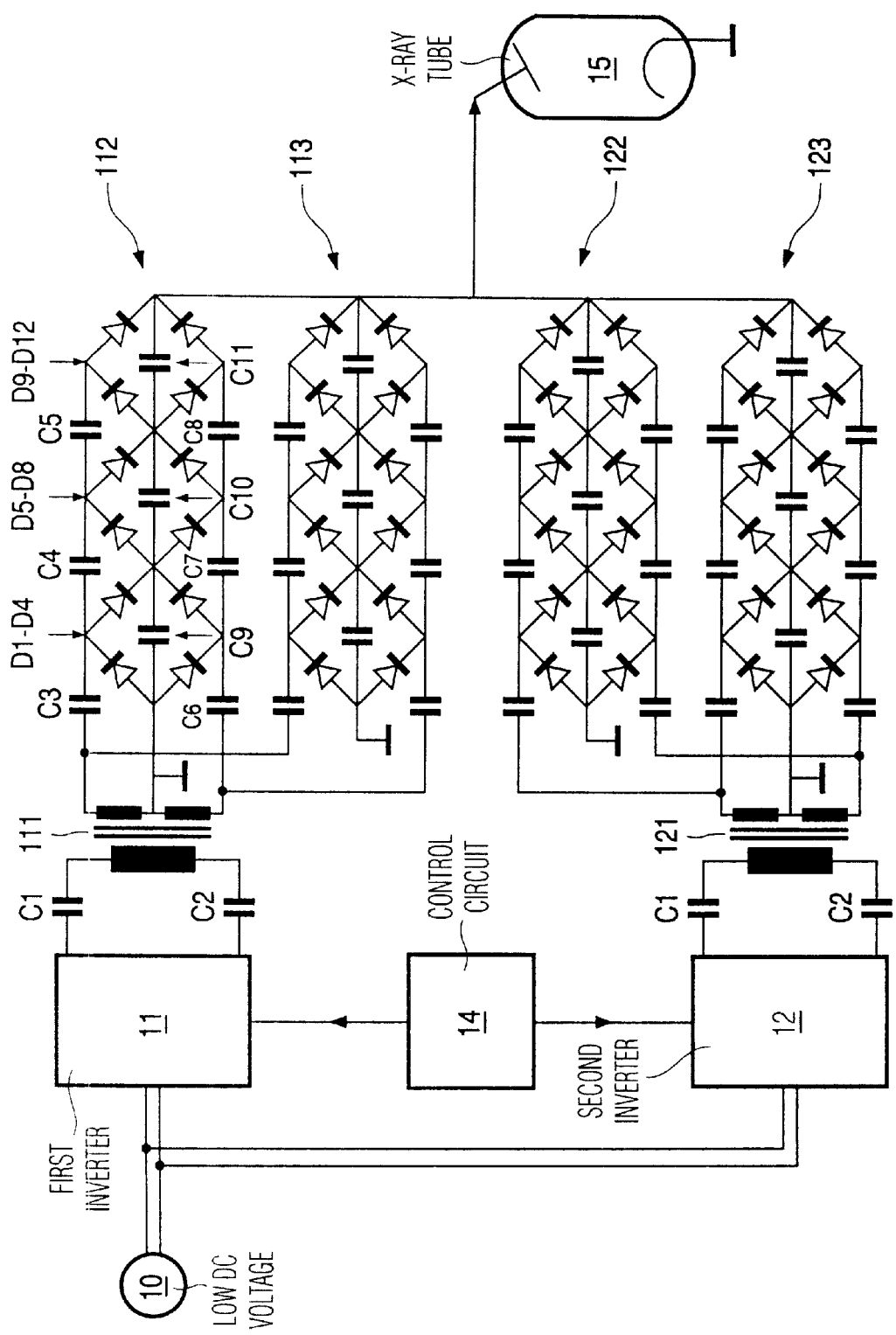
FIG. 3 shows a circuit diagram of a second embodiment in accordance with the invention.

FIG. 3 shows a second embodiment in accordance with the invention which is configured for double-phased operation; for each phase there is provided an inverter 11, 12 whereto there are connected each time two voltage cascades 112, 113 and 122, 123, each of which comprises three stages. The voltage cascades 112, 113, 122, 123 are connected in parallel at the output side so as to be connected to the anode of an X-ray tube 15 whose cathode is connected to ground.

More specifically, the second circuit includes a first and a second inverter 11, 12 which are driven via a control circuit and whose inputs carry a low DC voltage 10. At the output side the inverters are connected, each time via a first and a second capacitor C1, C2 as well as via a first and a second transformer 111, 121, to a first and a second and to a third and a fourth voltage cascade (112, 113; 122, 123), respectively. The first and the second voltage cascade 112, 113 are connected parallel to the secondary side of the first transformer 111, whereas the third and the fourth voltage cascade are connected parallel to the secondary side of the second transformer 121.

Each of the voltage cascades 112, 113; 122, 123 comprises three stages which are composed in known manner of sliding capacitors C3 to C8, smoothing capacitors C9 to C11 and diodes D1 to D12. For the sake of clarity, FIG. 3 shows these elements only for the first cascade 112.

The operation of the inverters 11, 12, of the transformers 111, 121 and of the voltage cascades 112, 113; 122, 123 is the same as described above for the first circuit that is shown in FIG. 2, so that this operation will not be described again. This also holds for the choice of the switching frequency whereby the resonance is produced in dependence on the capacitance C1, C2, on the stray inductance of the transformers 111 and 121, as well as on the relevant equivalent capacitance of the cascades 112, 113 and 122, 123, and whereby a resonance current is imposed in the cascades.

The inverters 11, 12 are successively driven by the control circuit 14 in such a manner that the two AC voltages generated exhibit preferably the same phase shift relative to one another (2-phase mode of operation). The output power is again adjusted by way of a variation of the switching frequency and/or the pulse duty factor of the pulse voltage whereby the inverter or inverters 11, 12 are controlled.

Figure 4:
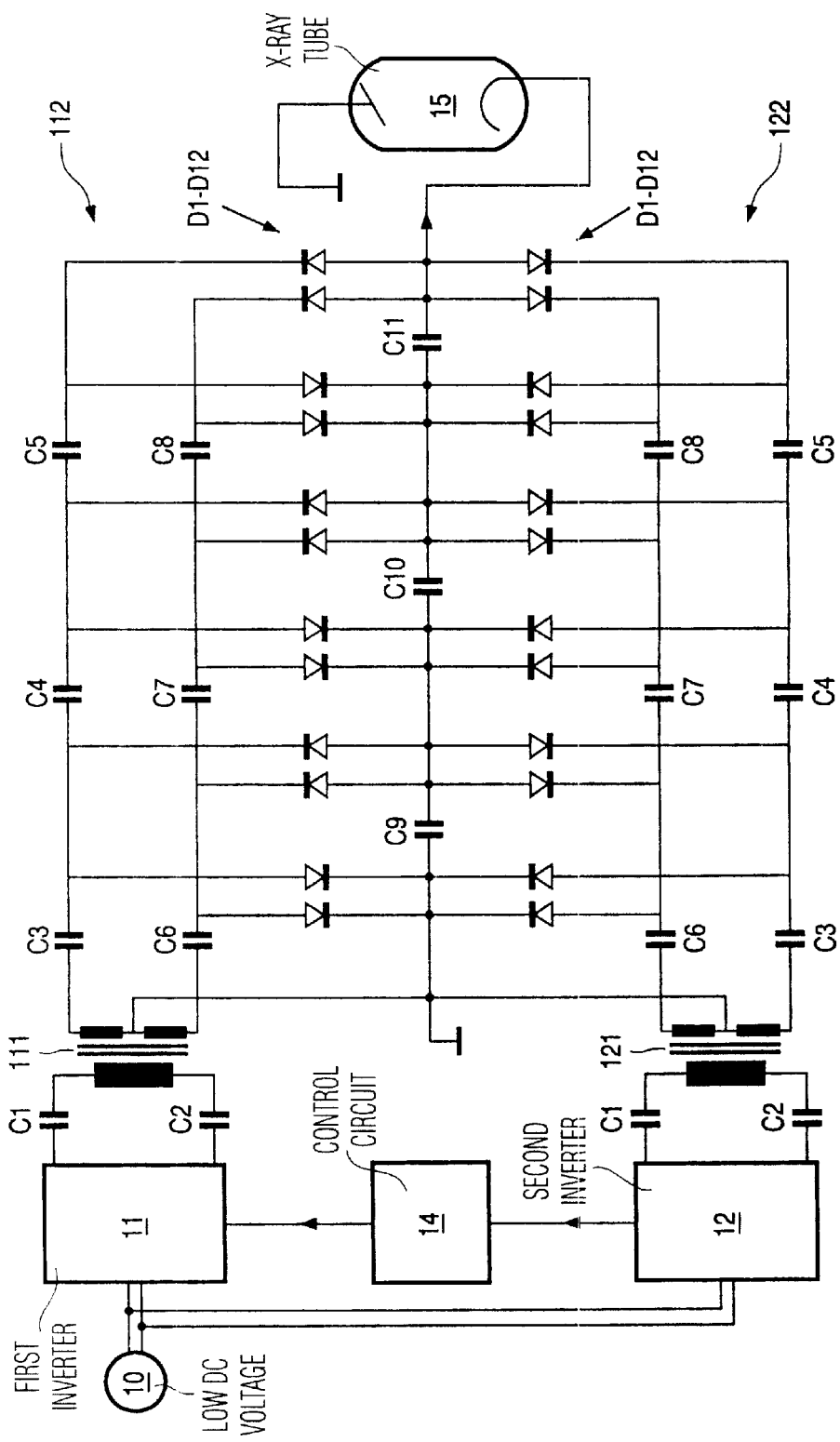
FIG. 4 shows a circuit diagram of a third embodiment in accordance with the invention.

Finally, FIG. 4 shows a third embodiment of the invention whereby a negative high voltage is generated for the cathode of an X-ray tube 15 whose anode is connected to ground. Elements that are the same as or correspond to elements shown in FIG. 3 are denoted by the same reference numerals.

Like the second circuit shown in FIG. 3, the third circuit is configured so as to be a double-phase type that is provided with a respective inverter 11, 12 for each phase. The input of the inverters 11, 12 again carries a DC voltage 10 whereas a control circuit 14 serves for the temporally offset driving of the inverters with a switching frequency that produces resonance and has been selected as described above.

The output power is again adjusted by variation of the switching frequency and/or the pulse duty factor of the pulse voltage of the control circuit 14 whereby the inverters 11, 12 are driven.

A difference with respect to the second embodiment, however, consists in the presence of two voltage cascades 112, 122 which comprise three stages each, each cascade including diodes D1 to D12 and capacitors C3 to C8, and a smoothing column consisting of capacitors C9 to C11 is provided for the two cascades in common.

The outputs are connected in parallel and to the cathode of an X-ray tube 15 whose anode is connected to ground.

The peak power that can be realized by means of cascades can thus be further increased by means of the circuit principle in accordance with the invention. Because of the comparatively low weight involved, compact single tank generators can thus be realized for different power ranges and applications, that is, for the recording of photographic X-ray images as well as moving images, as well as for rotating X-ray systems.

Finally, it is particularly advantageous that the input transformer required for an n-stage cascade merely has to generate an output voltage that amounts to only approximately $U_{tube}/n$. This enables a significant reduction of the transformer components in terms of high voltage. The same holds for the capacitors and diodes where between the powers are each time comparatively evenly distributed, so that they are loaded to a comparatively small degree only.

In order to clarify the advantages that can be achieved by the invention in respect of reduced loading of the components, for the first embodiment as shown in FIG. 2 the three-phase configuration shown therein will be compared with a two-phase configuration as well as a single-phase configuration. It is assumed in this respect that the switching frequency of the inverters amounts to approximately 40 kHz and that the output carries a voltage of approximately 100 kV with a current of approximately 1 A.

In the case of a single-phase configuration of the circuit shown in FIG. 2, provided with only one cascade 112, one transformer 111 as well as one inverter 11, a ripple $DU_A$ of the output voltage of approximately 4 kV, that is, approximately 4%, is achieved by means of four smoothing capacitors C11 to C14 of a capacitance of approximately 1.1 nF each as well as by means of eight sliding capacitors C3 to C10 of a capacitance of approximately 11 nF each. The mean current through the diodes D1 to D16 then amounts to approximately 0.5 A.

In the case of a two-phase configuration with two cascades 112, 122, two transformers 111, 121 as well as two inverters 11, 12, a ripple of the output voltage of approximately 1 kV, that is, 1%, is achieved by means of each time four smoothing capacitors C11 to C14 in each cascade, having a capacitance of approximately 0.05 nF each, as well as by means of each time eight sliding variable capacitors C3 to C10 in each cascade, having a capacitance of approximately 5 nF each. The mean current through the diodes D1 to D16 in each cascade then amounts to approximately 0.25 A.

Finally, in the case of the three-phase configuration with three cascades 112, 122, 132 in conformity with FIG. 2, with four smoothing capacitors C11 to C14 in each cascade with a capacitance of approximately 0.05 nF each as well as with each time eight sliding capacitors C3 to C10 in each cascade with a capacitance of approximately 3.3 nF each, a ripple of the output voltage which amounts to only 0.7 kV is achieved (that is, 0.7%). The mean current through the diodes D1 to D16 in each cascade then amounts to approximately 0.16 A.

This demonstrates that as the number of phases increases the number of components increases accordingly; however, it also appears that these components can be proportioned so as to be significantly smaller while the ripple of the output voltage is significantly smaller nevertheless.

Furthermore, because of the associated reduction of the output voltage of the transformers, the two-phase configuration and notably the three-phase configuration enable implementation of the transformers in the planar technique and construction of the primary windings and/or the secondary windings in the form of inductances that are printed on the circuit board. A further saving in respect of weight and a further reduction of the volume as well as simplification of the manufacture are thus achieved.

What is claimed is:

1. A power supply for a rotating x-ray system comprising:
   an inverter operative at a switching frequency for converting an input voltage applied to the inverter into an output AC voltage,
   a voltage cascade coupled to said inverter operating at a resonance current, the resonance current being dependent on the switching frequency, and a control circuit coupled to the inverter, the control circuit generating the switching frequency such that a desired resonance current is imposed in the voltage cascade.

2. The power supply according to claim 1 further comprising a capacitor interposed between the inverter and the voltage cascade.

3. A power supply as claimed in claim 1 wherein the power supply is mounted on a rotating portion of the rotating x-ray system.

4. A tank generator with an X-ray source and an X-ray generator, wherein the tank generator includes a power supply as claimed in claim 1.

5. A power supply as claimed in claim 1, wherein the control circuit is configured such that at least one of the frequency and the pulse duty factor of the switching voltage is adjustable in order to change the output DC voltage and the output current.

6. A power supply as claimed in claim 1, further comprising a transformer operatively coupled between the inverter and the voltage cascade, whose stray inductance forms a resonant circuit in conjunction with the capacitance of the voltage cascade.

7. A power supply as claimed in claim 6, wherein the transformer is constructed by means of the planar technique as inductances in the form of tracks printed on a circuit board.

8. An X-ray generator provided with a power supply as claimed in claim 7.

9. An X-ray system which includes an X-ray source and an X-ray generator as claimed in claim 8, wherein the x-ray system is intended notably for mobile or surgical applications.

10. An X-ray system as claimed in claim 9, wherein the x-ray system includes a computed tomography apparatus.

11. The power supply according to claim 6 further comprising a capacitor interposed between the inverter and the transformer.

12. A power supply for a rotating x-ray system, comprising:

at least two voltage cascades;

at least two inverters each operatively coupled to at least one of the voltage cascades and arranged to convert an input voltage applied to the inverter into an output AC voltage;

at least two transformers each operatively coupled between one of the inverters and one of the voltage cascades; and a control circuit operatively coupled to the inverters, the control circuit generating switching voltages, the inverters being responsive to the switching voltages and being driven at a switching frequency such that a resonance current is imposed in the voltage cascade and such that the AC voltages generated by the inverters exhibit a phase shift relative to one another.

13. A power supply for a rotating x-ray system, comprising:

three voltage cascades;

three inverters each operatively coupled to at least one of the voltage cascades and arranged to convert an input voltage applied to the inverter into an output AC voltage;

three transformers each operatively coupled between one of the inverters and one of the voltage cascades; and a control circuit operatively coupled to the inverters, the control circuit generating switching voltages, the inverters being responsive to the switching voltages and being driven at a switching frequency such that a resonance current is imposed in the voltage cascade and with a phase shift of approximately 120 degrees.

* * * * *